Figure 1:
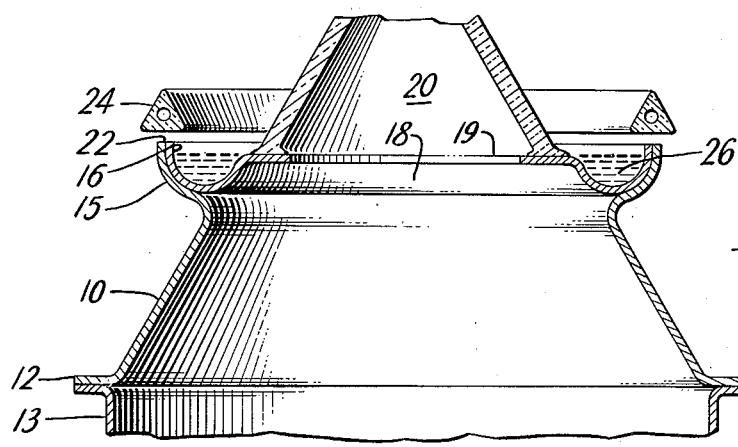

Oct. 12, 1954   H. C. M. LONGACRE   2,691,457
CATHODE-RAY TUBE ENVELOPE
Filed Nov. 30, 1949

INVENTOR
HENRY C. M. LONGACRE
BY
ATTORNEY

Patented Oct. 12, 1954

2,691,457

UNITED STATES PATENT OFFICE 2,691,457

CATHODE-RAY TUBE ENVELOPE

Henry C. M. Longacre, Floral Park, N. Y., assignor to Sylvania Electric Products Inc., a corporation of Massachusetts Application November 30, 1949, Serial No. 130,299

9 Claims. (Cl. 220—2.3)

The present invention relates to a welded joint and to a method of making the same, and more particularly to a welded joint between pieces of metal at least one of which may contain a large metal-to-glass seal such as may be encountered in the fabrication of large electron discharge devices, such as cathode ray tubes used for television picture purposes.

An object of the present invention is the improvement of the art of welding.

Another object of the present invention is the improvement of the art of induction flash welding.

Another object of the present invention is the making of an induction flash weld very close to the rim of a large metal-to-glass seal wherein the glass is peripherally surrounded by a narrow metal rim.

Another object of the present invention is the provision of a novel composite glass and metal hermetically sealed container.

Still another object of the present invention is the provision of a novel form of metal-glass cathode ray tube.

The foregoing objects and others which may appear from the following detailed description are attained in an embodiment of the present invention to be described in detail hereafter by providing a plurality of assembly elements which are to be hermetically sealed together to produce a container capable of being hermetically sealed. One of these elements includes a glass piece having a substantial circumferential length which is sealed to a metal piece in the form of an annulus of comparatively thin metal having a retroflex rim portion formed as a shallow curved lip or gutter. The second metal piece to which the first, including the metal annulus, is to be welded is provided with a mating circumferential concave rim of such dimensions that the rim of the first piece sits uniformly within the rim of the second piece and preferably bears against it only at the outer rim portion.

In making the weld the two pieces are assembled with the concave portion of the lips upward and an induction heating coil is placed above the edge to be welded and in close proximity thereto. High frequency currents are then applied to the induction heating coil, said currents being of such magnitude that, in a fraction of a second, the upper edges of both rims melt and flow together to form an airtight seal around the full circumference. The trough in the first metal piece may, if desired, contain a liquid coolant to thermally isolate the glass-to-metal seal from the weld at the time the weld is being made. In some cases, it has been found that the weld may be so quickly made that the operation is complete before the heat of the weld can travel as far as the glass-to-metal seal, even without the use of a coolant.

In one embodiment of the present invention the weld just described is used to join a metal ring or annulus which is sealed to the glass neck of a metal cathode ray tube to the body of the hollow conical member which carries on the base a glass face plate bearing a fluorescent screen material on its inner surface.

It is also contemplated as being within the scope of the present invention to directly seal the face plate of the cathode ray tube to a narrow annular metal ring and to thereafter weld the ring to the open end of the conical metal member forming the main part of the body of the cathode ray tube. The face plate may be either square or circular as desired. If a liquid coolant is to be maintained in the gutter between the weld and the glass-to-metal seal, it is desirable to so shape the edges of the two parts that when they are placed together for the welding operation the edges to be welded are truly horizontal.

This manner of making a seal close to a glass-to-metal seal has several advantages. Any expansion which occurs at the welded edge must be either radial or in the direction parallel to the rim of the outer lip. Expansion in the latter direction does not affect the metal at the position where the glass-to-metal seal is made. Expansion in the radial direction has a minimum effect at the point where the glass seal is made due to the intervening retroflex curvature of the metal lip. Therefore, the possibility of strain in the glass seal which would cause a fracture of the glass seal due to expansion is eliminated.

The tight fit between the two lip parts makes possible perfect alignment merely by bringing the mating surfaces of the two parts tightly together. The two parts, having outer concave lips, which fit together, may readily be so designed as to allow cheap fabrication while still maintaining close tolerances. The upward facing position of the mated edges makes possible the placement of the induction work coil above the parts to be welded whereby the adjustment of the coupling of the work to the coil becomes a simple axial movement. As close spacing as desired may readily be obtained without the possibility of an inadvertent slight radial shift causing a short circuit of the work coil. The inverted edge, which is perpendicular to the force of gravity, tends to eliminate the loss of molten metal from the edge and causes the molten metal to flow in an even bead around the full circumference. Molten metal is also drawn into any slight gap which may exist between the two pieces of metal by the force of gravity and by surface tension, thus eliminating the possibility of open welds. The concave curvature of the upper part provides a trough in which water may be placed for a cooling medium, reducing the heat transfer to the glass seal. Furthermore, heat transfer to the glass seal is also reduced by the downward curvature of the inner curved lip. While it is notoriously difficult to make entirely satisfactory welds between pieces made of stainless steel, the present arrangement has enabled me to satisfactorily hermetically weld 20 gauge stainless steel pieces together in less than a half second and within one-half inch of a previously made metal-to-glass seal. Welds which I have made and tested having a circumference of the order of 30 inches have shown a weld section approximately .050 inch thick and have withstood vacuum testing; and the application of internal pressures up to 75 pounds per square inch over a wide range of temperatures up to 350 degrees centigrade while still continuing to be vacuum-tight.

Figure 2:
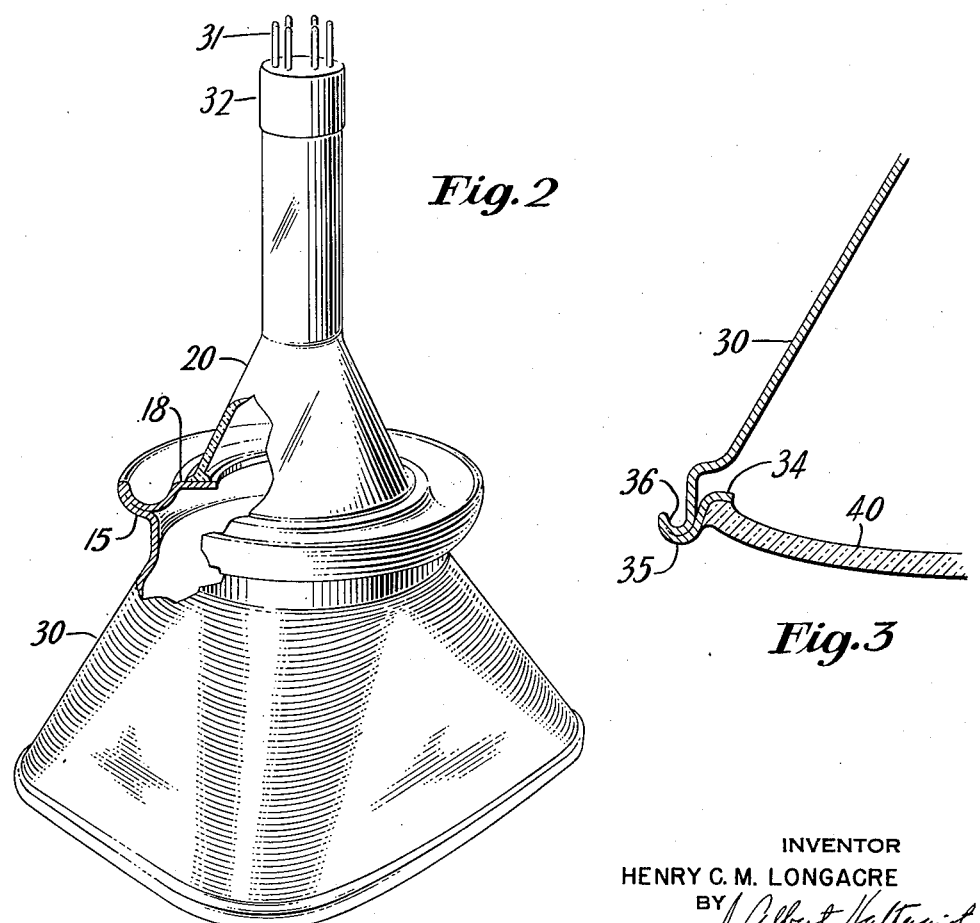
Figure 3:
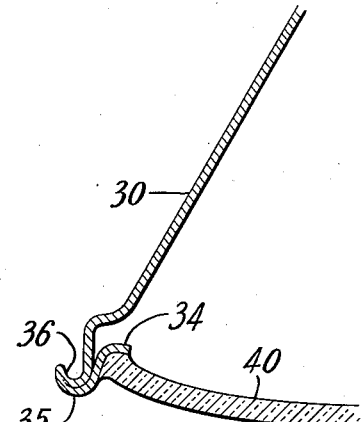

The present invention will be more fully understood by reference to the following detailed description which is accompanied by a drawing in which Figure 1 illustrates in vertical cross section a portion of an embodiment of the present invention in position under an induction heating work coil just prior to the actual making of the weld, while Figure 2 illustrates a rectangular-faced metal body cathode ray tube in which an aspect of the present invention is employed in joining a metal ring which is sealed to the glass neck of the cathode ray tube to the main metal body of the tube, while Figure 3 is a partial sectional vew of a seal between a metal rim surrounding the face plate of a metal cathode ray tube and the conical metal body of the tube itself.

In Figure 1 I have shown a truncated, hollow, conical metal member 10 which forms a part of the body of a metal cathode ray tube. Cone member 10 may continue as one piece on down to the point where the face plate is sealed to the cone or it may, as shown in Figure 1, be divided from the cone proper at point 12. In the latter case the upper part 10 is preferably conical in form while the lower part 13 may be a frustum of a rectangular pyramid, whereby a rectangular face metal cathode ray tube is provided. Thus the conical member 10 serves as a transition piece between the pyramidal body and the glass neck of the cathode ray tube.

Member 10 is provided at its upper edge (Figure 1), with a retroflex or outwardly turned back hollow lip portion 15, within which is adapted to be seated the convex side of the hollow lip portion 16 of a metal annulus 18 having a central aperture 19. On the upper surface of the annulus 18 and closely adjacent its central aperture 19 the glass neck 20 of the cathode ray tube has previously been sealed in place. It will be noted that curved pieces 15 and 16 fit snugly together, particularly at their upper edges at 22. The axial alignment between the neck 20 of the cathode ray tube and the main part of the metal cone is readily determined by the fit between members 15 and 16. Since the edge 22 to be welded extends upwardly, it is very simple to place the induction heating work coil 24 closely adjacent to edge 22 so efficient coupling between the work and the energy in coil 24 is provided, without at the same time, running the risk of accidental short circuits between the coil and the work. An axial spacing of a tenth of an inch or so has proven satisfactory. Coil 24 is preferably hollow so that a cooling fluid may be circulated through the coil when the radio frequency energy is applied to it.

Since the outer lip of member 18 is concave upwardly, a sort of trough or gutter is formed around the edge between the location of the weld and the glass-to-metal seal around aperture 19. In order to prevent the flow of so much heat from the weld point to the glass-to-metal seal, that cracking of the seal might occur, a cooling fluid such as water may be placed in the trough as indicated at 26.

When the work coil 24 is energized with high frequency energy at a sufficient current rating, the edges 22 of members 15 and 16 are brought to a molten temperature such that a firm weld takes place in a very short period of time. A small fraction of a second, of the order of one tenth to one-half a second, has proven sufficient to make a good weld. Immediately after the weld is completed, due to the rapid manner in which the weld is produced and even without the presence of the cooling liquid 26, it has been found that the glass-to-metal seal area is cool enough to touch with the bare hand without danger of burning. Since the portion of the metal which is melted to form the weld is directly above the seam line between the two parts there is little or no tendency for molten metal to drip from the edge but rather it tends to flow into an even bead around the full circumference. The molten metal is also drawn into the gap between members 15 and 16 by the force of gravity and surface tension, thus eliminating all possibility of open welds.

Since the weld takes place so rapidly, welds between pieces of stainless steel may readily be made because the metal reaches a flowing temperature before there has been any substantial opportunity for oxidation products to form over the surface of the metal.

In the embodiment of the invention shown in Figure 2, the hollow rim member 15 is an integral part of the truncated pyramidal member 30 forming the main body of the cathode ray tube. The base of the truncated pyramid has a glass face plate sealed into it with fluorescent material coated on its inner surface. Within the upper portion of the neck 20 of the cathode ray tube is located a conventional electron gun structure, the various elements of which are connected to lead-in wires connected to the pins 31 of base 32. The weld between members 18 and 30 of Figure 2 is made in the same way as described above with reference to Figure 1. In this form the fluorescent screen on the face plate of the tube may, if desired, be completely finished before the neck 20 is sealed onto the cone 30. The large aperture at the apex of the pyramid 30 facilitates the forming and processing of the fluorescent screen.

In Figure 3 I have shown the application of the present invention to the sealing of the face plate to the conical metal member 30 of the cathode ray tube. In this modification the base of the conical member 30 is provided with a turned-back rim 36 similar to the concave rim 16 of member 18 of Figures 1 and 2. The face plate 40 is previously sealed at its periphery to a metal rim member 34 having a turned-back outer rim member 35. Members 35 and 36 are placed together as described above with reference to parts 15 and 16 of Figure 1, a heating work coil is placed over the assembled parts and the junction between the two members heated by induction as described with reference to that figure.

Even though there is a comparatively massive glass-to-metal seal around the periphery of face plate 40 where it joins to the rim member 34, the weld between members 35 and 36 may be completed so quickly that there is substantially no possibility of the face plate 40 cracking due to heat strain. Furthermore, the reentrant form of the edge of cone 30 provides a strain isolation feature between the edges of face plate 40 and the rim of the cone so that the pressures applied to the outside of cone 30 during exhaust of the tube do not tend to apply twisting forces of such magnitude to the glass-to-metal seal as to cause cracking of the face plate.

It will be noted that in using this form of construction the interior surface of the face plate 30 is entirely free and open until it is assembled to the cathode ray tube, and since there is no substantial heat involved in the sealing operation it is possible to completely form the fluorescent screen on the inner surface of face plate 40 before the face plate is assembled to the cone member 30.

While I have shown and particularly described several embodiments of the present invention it should be distinctly understood that my invention is not limited thereto but that modifications and alterations within the scope of the invention may be made.

What I claim is:

1. A cathode ray tube having a metal body portion and glass neck and face plate portions, said neck being sealed to a thin annular metal ring member having an outwardly retroflex outer rim, said body portion having a hollow end adapted to closely receive said outer rim, the outer peripheries of said rim and said hollow end being welded together.

2. A cathode ray tube having a metal body portion and glass neck and face plate portions, said face plate being sealed into a thin metal ring having a retroflex outer rim and said body portion having a retroflex outer rim adapted to closely fit within the retroflex rim of said ring, the outer peripheries of said rims being welded together.

3. A cathode ray tube having a metal body portion and glass neck and face plate portions, said neck being sealed to a thin annular metal ring member having a retroflex outer rim, said body portion having a hollow end adapted to closely receive said outer rim, the outer peripheries of said rim and said hollow end being welded together, said face plate being sealed into a thin metal ring having a retroflex outer rim and said body portion having a retroflex outer rim adapted to closely fit within the retroflex rim of said ring, the outer peripheries of said rims being welded together.

4. A composite glass metal article including a tubular glass neck member having a metal rim sealed to one end and a metal body member, said rim and body member each being provided with a hollow rim, said rims being adapted to fit one within the other, said rims being welded together along their periphery.

5. A cathode ray tube having a metal body portion and glass neck and face plate portions, said neck being sealed at one end to a thin annular metal ring member having an outwardly turned back retroflexed outer rim, said body portion having concave edge portions at one end adapted to closely receive said outer rim, the outer peripheries of said rim and said edge being welded together.

6. The method of joining two sheet metal members, one being an annular member having an aperture therein and having a glass member sealed adjacent its aperture, said metal members having curved hollow outer rims adapted to fit one within the other and comprising interfitting said metal members so that one rim nests within the other with the free edges of said rims facing upwardly and inducing a circulating electric current in said rims of sufficient magnitude to cause said rims to fuse together at their outer edges before substantial heat is conducted to said glass member.

7. The method of joining two sheet metal members, one being an annular member having an aperture therein and having a glass member sealed adjacent its aperture, said metal members having curved hollow outer rims adapted to fit one within the other and comprising nesting the rim of one metal member within the rim of the other and disposing said assembly so that the free edges of said rims face upwardly, and simultaneously heating the entire periphery of each of said rims so rapidly as to fuse them together before sufficient heat to affect the seal between said annular member and said glass member is conducted to said seal.

8. The method of joining two sheet metal members, one being an annular member having an aperture therein and having a glass member sealed adjacent its aperture, said metal members having curved hollow outer rims adapted to fit one within the other and comprising interfitting said metal members with one rim within the other and the free edges of said rims facing upwardly, supplying a cooling fluid to the hollow of the uppermost of said rims, and inducing a circulating electric current in said rims of sufficient magnitude to cause said rims to fuse together at their outer edges before substantial heat is conducted to said glass member.

9. The method of joining two sheet metal members, one being an annular member having an aperture therein and having a glass member sealed adjacent its aperture, said metal members having curved hollow outer rims adapted to fit one within the other and comprising nesting the rim of one metal member within the rim of the other, the free edges of said rims facing upwardly whereby a fluid retaining gutter is provided, supplying said gutter with a cooling fluid and simultaneously heating the entire outer edges of said rims so rapidly as to fuse them together before sufficient heat to affect the seal between said annular member and said glass member is conducted to said seal.

(References on following page)

References Cited in the file of this patent

UNITED STATES PATENTS

| Number | Name | Date |
|---|---|---|
| 151,435 | Ripley | May 26, 1874 |
| 1,184,813 | Birdsall | May 30, 1916 |
| 1,294,416 | Dady | Feb. 18, 1919 |
| 1,350,572 | Smith | Aug. 24, 1920 |
| 1,658,100 | Rijns | Feb. 7, 1928 |
| 1,939,356 | Lindgren | Dec. 12, 1933 |
| 1,963,008 | Weeks | June 12, 1934 |
| 2,083,519 | Miller | June 8, 1937 |
| 2,184,939 | Green | Dec. 26, 1939 |
| 2,189,261 | Bowie | Feb. 6, 1940 |
| 2,194,418 | Bowie | Mar. 19, 1940 |
| 2,219,574 | Fraenckel | Oct. 29, 1940 |
| 2,254,090 | Power | Aug. 26, 1941 |
| 2,277,871 | Mitchell et al. | Mar. 31, 1942 |
| 2,296,579 | Seelen | Sept. 22, 1942 |
| 2,444,312 | Roberds et al. | June 29, 1948 |
| 2,479,755 | Martin | Aug. 23, 1949 |

FOREIGN PATENTS

| Number | Country | Date |
|---|---|---|
| 423,358 | Great Britain | Jan. 30, 1935 |